US012736084B2

(12) United States Patent
Kabeya et al.

(10) Patent No.: US 12,736,084 B2
(45) Date of Patent: Sep. 15, 2026

(54) SLIDING MEMBER AND SLIDE BEARING

(71) Applicant: TAIHO KOGYO CO., LTD., Toyota (JP)

(72) Inventors: Yasunori Kabeya, Toyota (JP); Moe Nashimoto, Toyota (JP); Shuhei Sunada, Toyota (JP); Shu Kamiya, Toyota (JP); Masanori Akizuki, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 248 days.

(21) Appl. No.: 18/519,987

(22) Filed: Nov. 27, 2023

(65) Prior Publication Data

US 2024/0175467 A1 May 30, 2024

(30) Foreign Application Priority Data

Nov. 29, 2022 (JP) ................................ 2022-190245
Oct. 3, 2023 (JP) ................................ 2023-171830

(51) Int. Cl.
*F16C 33/20* (2006.01)

(52) U.S. Cl.
CPC ........ *F16C 33/201* (2013.01); *F16C 2202/54* (2013.01)

(58) Field of Classification Search
None
See application file for complete search history.

(56) References Cited

U.S. PATENT DOCUMENTS 4,919,829 A * 4/1990 Gates .................. C10M 103/06 423/625
2013/0337271 A1* 12/2013 Yoshikawa .......... C10M 111/04 508/108
2014/0329729 A1* 11/2014 Becker-Willinger ........................ C09D 5/1662 508/106

FOREIGN PATENT DOCUMENTS

JP 4-83914 A 3/1992
JP 3182210 B2 7/2001
JP 3733539 B2 1/2006
JP 4485131 B2 6/2010
JP 6122488 B2 4/2017
WO WO2006006697 * 1/2006

OTHER PUBLICATIONS

Machine Translation of WO2006006697 Shibuya et al. (Year: 2006).*

* cited by examiner

*Primary Examiner* — Shawn Mckinnon
(74) *Attorney, Agent, or Firm* — Sughrue Mion, PLLC

(57) ABSTRACT

A sliding member with improved wear resistance. The sliding member including a base layer and a resin coating layer formed on the base layer; where the resin coating layer includes a polyamidimide resin as a binder; a solid lubricant; boehmite particles of greater than 0 vol % and less than or equal to 1.0 vol %; and inevitable impurities.

2 Claims, 6 Drawing Sheets

SLIDING MEMBER AND SLIDE BEARING

BACKGROUND OF THE INVENTION

(1) Field of the Invention

The present invention relates to a sliding member having a resin coating layer and a slide bearing.

(2) Description of Related Art

Conventionally, in a sliding member including a back metal layer and a sliding layer, it is known to form a resin coating layer including a synthetic resin and a solid lubricant dispersed in the synthetic resin. For example, Patent Document 1 discloses a configuration in which a resin coating layer contains a solid lubricant and a hard material.

PRIOR ART DOCUMENT

Patent Literature

Patent Document 1: Japanese Patent Publication No.

SUMMARY OF THE INVENTION

In the conventional sliding member disclosed in Patent Document 1 and the like, the hard material is, for example, SiC. These hard materials added to the conventional sliding member are, for example, SiC and are very hard substances having a Mohs hardness of about 8.5 to 9.5. Conventionally, it has been considered that the wear of the resin is suppressed and the wear resistance is improved by containing such a hard substance in the resin coating layer. However, since these hard materials are very hard, when the resin containing the hard material is transferred to the mating material, the transferred hard material wears the resin coating layer.

The present invention has been made in view of the above problems, and an object thereof is to provide a technique for improving wear resistance.

In order to achieve the above object, a sliding member is a sliding member including a base layer and a resin coating layer formed on the base layer, in which the resin coating layer includes a polyamidimide resin as a binder, a solid lubricant, boehmite particles in an amount of greater than or equal to 0 vol % and less than or equal to 1.0 vol %, and inevitable impurities.

Boehmite (AlOOH) has a smaller contact angle with engine oil than a conventionally used hard material such as SiC. Therefore, the friction coefficient of the sliding member using the boehmite particles is smaller than that of the sliding member using the conventional hard material, and the transfer amount of the resin coating layer containing the boehmite particles to the mating material is smaller than that of the conventional resin coating layer.

Furthermore, Boehmite is a relatively hard material, but a hard material such as SiC which has been conventionally used is harder. Therefore, in the sliding member in which the boehmite particles are used as the hard material, even if transfer to the mating material occurs, the wear of the resin coating layer due to the transferred hard material is less than that of the conventional resin coating layer. Therefore, according to the sliding member containing boehmite as a hard material, wear resistance can be improved as compared with the sliding member containing a substance such as SiC as a hard material.

DESCRIPTION OF EMBODIMENTS

Here, an embodiment of the present invention will be described in the following order.

(1) Configuration of sliding member
(2) Method for manufacturing sliding member:
(3) Test results:
(4) Other embodiments:

(1) Configuration of Sliding Member

Figure 1:
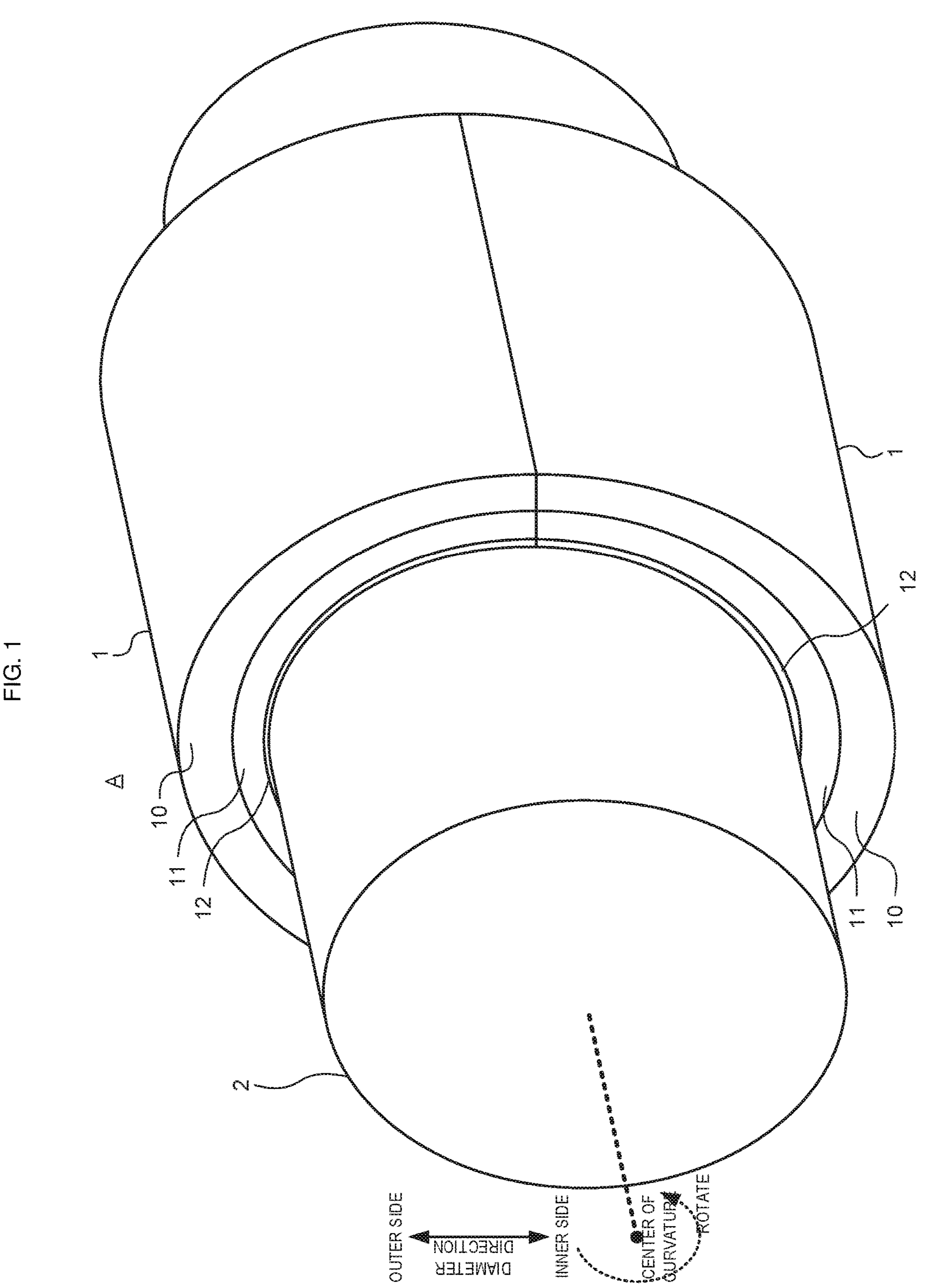
FIG. 1 is a perspective view of a sliding member according to an embodiment of the present invention.

FIG. 1 is a perspective view of a sliding member 1 according to an embodiment of the present invention. The sliding member 1 includes a back metal 10, a lining 11, and an overlay 12. The sliding member 1 is a metal member of a half-divided shape obtained by dividing a hollow cylinder into two equal parts in a diameter direction, and has a semicircular arc cross section. The slide bearing A is formed by combining the two sliding members 1 so as to form a cylindrical shape. The slide bearing A bears a circular column shaped mating material 2 (crankshaft of the engine) in a hollow portion formed inside. The outer diameter of the mating material 2 is formed to be slightly smaller than the inner diameter of the slide bearing A. Lubricating oil (engine oil) that is a liquid lubricant is supplied to a gap formed between the outer peripheral surface of the mating material 2 and the inner peripheral surface of the slide bearing A. At that time, the outer peripheral surface of the mating material 2 slides on the inner peripheral surface of the slide bearing A.

The sliding member 1 has a structure in which the back metal 10, the lining 11, and the overlay 12 are sequentially laminated in order of farness from the center of curvature. Therefore, the back metal 10 constitutes the outermost layer of the sliding member 1, and the overlay 12 constitutes the innermost layer of the sliding member 1. The back metal 10, the lining 11, and the overlay 12 each have a constant thickness in the diameter direction without the thickness changing in the circumferential direction. For example, the thickness of the back metal 10 is 1.0 mm to 2.0 mm, and the thickness of the lining 11 is 0.2 mm to 0.4 mm. The back metal 10 is formed of, for example, steel.

The lining 11 is a layer laminated on the inner side of the back metal 10 and constitutes a base layer. The lining 11 is formed of, for example, an Al alloy or a Cu alloy. The thickness of the overlay 12 is, for example, 6 μm. Note that the thickness of the overlay 12 may be 2 to 20 μm. Hereinafter, the inner side means the side of the center of curvature of the sliding member 1, and the outer side means the side opposite to the center of curvature of the sliding member 1. The surface on the inner side of the overlay 12 constitutes a sliding surface with the mating material 2.

The overlay 12 is a layer laminated on the surface on the inner side of the lining 11 and constitutes the resin coating layer of the present invention. The overlay 12 includes a polyamidimide resin as a binder, molybdenum disulfide particles as a solid lubricant, boehmite particles as a hard material, and inevitable impurities.

In the present embodiment, the volume fraction of the total volume of the molybdenum disulfide particles in the overlay 12 is 10 vol % to 70 vol %, and for example, 28 vol % to 40 vol %, 28 vol % to 34 vol %, 30 vol % to 34 vol %, or the like can be selected. The volume ratio between the polyamidimide resin and the molybdenum disulfide particles is calculated on the basis of the mass of the polyamidimide resin and the molybdenum disulfide particles measured before mixing them and the specific gravity thereof. Furthermore, the average crystal grain size of the molybdenum disulfide particles is 0.1 to 5.0 μm. Here, the crystal grain size is the radius of a circle equal to the area of the crystal grains observed in the cross section, and the average crystal grain size is the average of the radius of the circle. The average grain size can be measured by, for example, MT 3300 II from MicrotracBEL Corp. (the same applies hereinafter).

The volume fraction of the total volume of the boehmite particles in the overlay 12 is greater than 0 vol % and less than or equal to 1.0 vol %, and can be, for example, 0.1 vol % to 0.7 vol %. The volume ratio of the polyamidimide resin and the boehmite particles was calculated based on the mass of the polyamidimide resin and the boehmite particles measured before mixing them and the specific gravity thereof. The boehmite particles have a 50% particle diameter conforming to JIS R 1629-1997 of 0.6 μm to 0.9 μm. As another embodiment, a resin coating layer containing additives such as, for example, barium sulfate particles may be formed.

Figure 2:
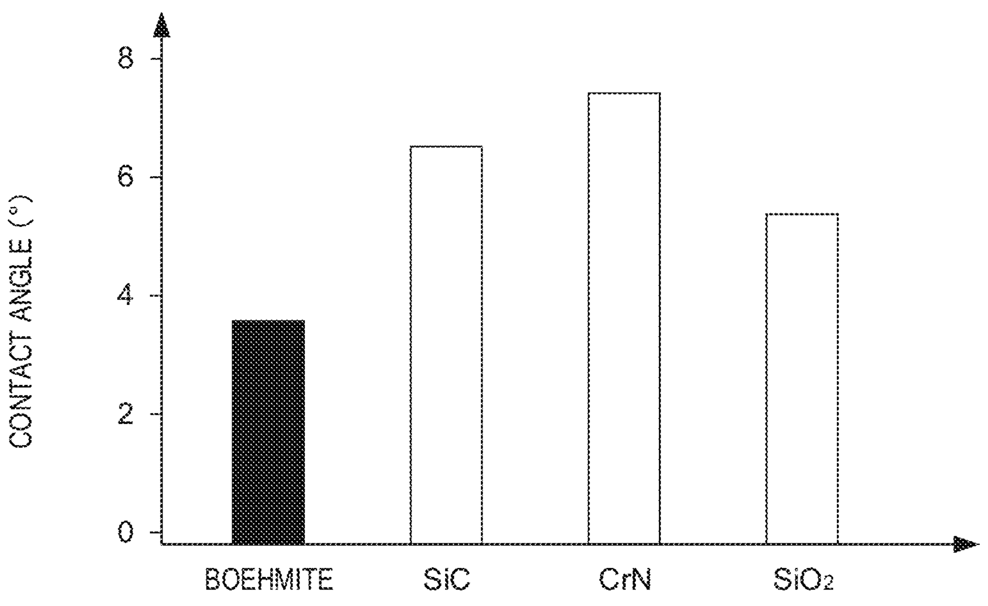
FIG. 2 is a view showing a contact angle of a hard material.

Boehmite particles have a smaller contact angle with engine oil than a conventionally used hard material such as SiC. FIG. 2 is a view showing a contact angle of a hard material. Specifically, the contact angles of a plurality of hard materials with engine oil (0W-8) were measured at normal temperature (25° C.) using a known contact angle meter. The hard material is boehmite, SiC, CrN, or $SiO_2$. As illustrated in FIG. 2, boehmite has a smaller contact angle than a hard material such as SiC. For this reason, when the resin coating layer containing boehmite particles is compared with the resin coating layer containing a hard material such as SiC, the friction coefficient at the time of mixed lubrication is assumed to be smaller in the former than in the latter.

Figure 3A:
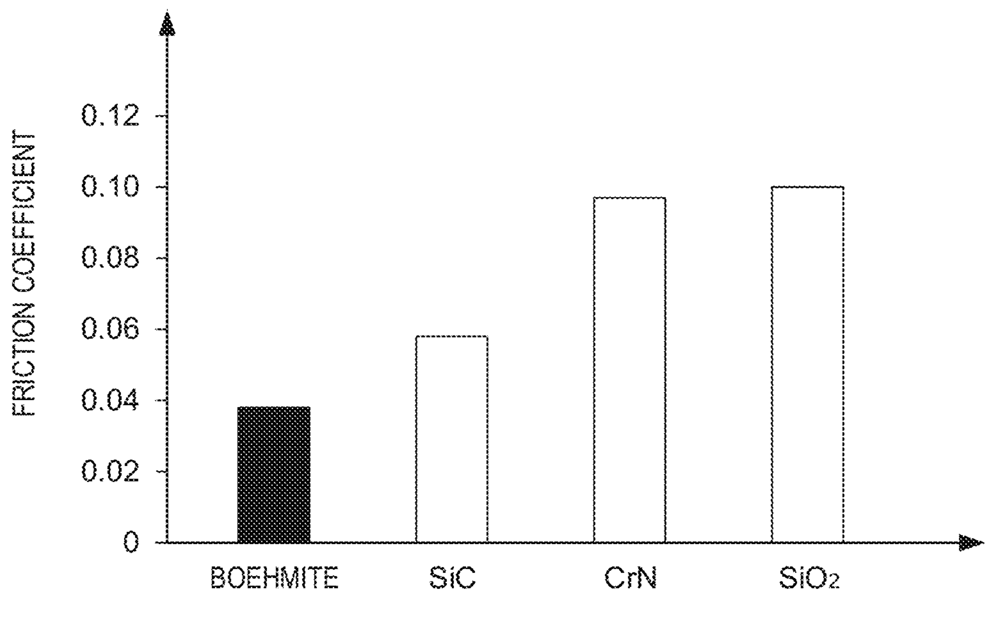
FIG. 3A is a view showing a friction coefficient of a hard material.
Figure 3B:
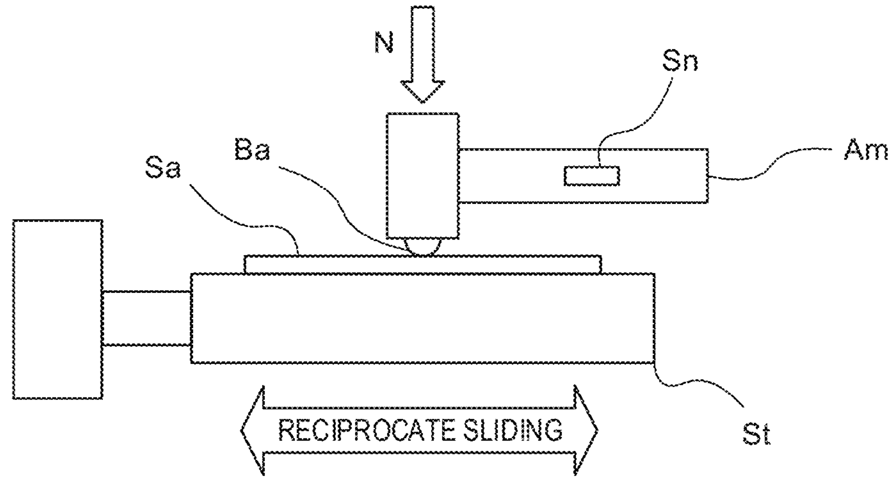
FIG. 3B is a schematic view of an evaluation testing machine of a friction coefficient.

FIG. 3A is a diagram illustrating a friction coefficient at the time of mixed lubrication. The friction coefficient was measured with a ball-on-plate testing machine as shown in FIG. 3B. Specifically, the sample Sa is attached to the stage St capable of reciprocate sliding in the linear direction, a ball Ba is formed of the same material as the mating material, and the ball Ba is attached to the arm Am. A sensor Sn such as a strain gauge is attached to the arm Am. The sample Sa has the same layer structure as the back metal 10, the lining 11, and the overlay 12 described above, but has a flat plate shape, and the hard material of each sample Sa is 1.17 vol %. The sample Sa is set on the stage St in a direction in which the ball Ba can come into contact with the overlay 12.

In this state, the overlay 12 is immersed in the engine oil (0W-8), and is set to 90° C. Then, a load N (1.96 N) was applied to the arm Am in a state where the speed of the reciprocate sliding of the stage St was set to 3 mm/s, and the force acting on the arm Am was measured by the sensor Sn to measure the friction coefficient of each overlay.

As shown in FIG. 3A, the resin coating layer containing boehmite particles has a smaller friction coefficient at the time of mixed lubrication than the resin coating layer containing other hard materials. Therefore, when the resin coating layer containing the boehmite particles slides on the mating material, the amount of the resin coating layer containing the boehmite particles being transferred to the mating material is smaller than the amount of the resin coating layer containing a hard material such as SiC being transferred to the mating material. As a result, in the resin coating layer containing boehmite particles, the amount of the transferred hard material wearing the resin coating layer is smaller than the amount of the transferred hard material wearing the resin coating layer in the resin coating layer containing a hard material such as SiC.

Furthermore, boehmite particles are substances having a Mohs hardness of 3.5 to 4, and can be said to be relatively hard substances. However, the boehmite particles are not harder than hard materials such as SiC that have been conventionally used in the resin coating layer, for example, SiC (Mohs hardness: 8.5 to 9.5), $SiO_2$ (Mohs hardness: 4.5 to 6.5), and CrN (Mohs hardness of Cr alone: 7 to 8.5). Therefore, also in this sense, in the resin coating layer containing the boehmite particles, the amount of the hard material transferred to the mating material wearing the resin coating layer is smaller than the amount of the hard material transferred to the mating material wearing the resin coating layer in the resin coating layer containing the hard material such as SiC. As a result, according to the sliding member containing boehmite particles as the hard material, the wear resistance can be improved as compared with the sliding member containing a substance such as SiC as the hard material.

(2) Method for Manufacturing Sliding Member

The sliding member 1 can be manufactured, for example, by sequentially performing (a) a half-divided base material forming step, (b) a pre-application treatment step, (c) an applying step, (d) a drying step, and (e) a firing step. Needless to say, the method for manufacturing the sliding member 1 is not limited to the above steps.

(a) Half-Divided Base Material Forming Step

The half base material forming step is a step of forming a base material in which the back metal 10 and the lining 11 are joined into a half-divided shape. For example, the base material in which the back metal 10 and the lining 11 are joined may be formed by sintering the material of the lining 11 on a plate material corresponding to the back metal 10. In addition, a base material in which the back metal 10 and the lining 11 are joined may be formed by joining a plate material corresponding to the back metal 10 and the lining 11 by rolling. Furthermore, the base material in which the back metal 10 and the lining 11 are joined may be processed into a half-divided shape by performing machining such as press working or cutting.

(b) Pre-Application Treatment Step

The pre-application treatment step is a surface treatment for improving the adhesion of the overlay 12 (resin coating layer) to the surface of the lining 11. For example, as the pre-application treatment step, a roughening treatment such as sandblasting may be performed, or a chemical treatment such as etching or a chemical conversion treatment may be performed. The pre-application treatment step is preferably performed after degreasing the oil content of the half-divided base material with a cleaning agent.

(c) Applying Step

The applying step is a step of applying the overlay 12 on the lining 11. In performing the applying step, an application liquid in which molybdenum disulfide particles and boehmite particles (also additives in some embodiments) are mixed to a polyamidimide resin is prepared. In addition, in order to enhance the dispersibility of molybdenum disulfide particles, boehmite particles, and additives, or to adjust the viscosity of the application liquid, a solvent such as N-methyl-2 pyrrolidone or xylene may be used as necessary.

At this time, mixing is performed such that the volume fraction of the total volume of the molybdenum disulfide particles in the overlay 12 is 10 vol % to 70 vol %, and the volume fraction of the total volume of the boehmite particles is greater than 0 vol % and less than or equal to 1.0 vol %. When an additive is contained, mixing is performed so as to have a predetermined volume fraction including the additive.

The applying step is not particularly limited as long as the overlay 12 can be formed on the lining 11. For example, air spray, airless spray, pad, screen printing, and the like can be used. In addition, pressure may be applied to be rubbed against the inner surface of the lining 11 with cloth, a plate, or the like. Furthermore, the applying step may be performed by an application roll. For example, the applying step can be performed by attaching the application liquid to a circular column shaped application roll having a diameter smaller than the inner diameter of the lining 11 and rotating the application roll on the inner surface of the lining 11. By adjusting the roll gap between the application roll and the inner surface of the lining 11 and the viscosity of the application liquid, the application liquid may be applied onto the inner surface of the lining 11 so that the film thickness after the (e) firing step, to be described later, becomes a desired thickness. The applying step is performed over a plurality of times, and as a result, the film thickness may become a desired thickness.

(d) Drying Step

The drying step is a step of drying the polyamidimide resin. For example, a configuration in which drying is performed at 40 to 180° C. for 5 to 60 minutes can be adopted.

(e) Firing Step

Furthermore, the sliding member 1 can be manufactured by firing (curing) the polyamidimide resin at, for example, 200 to 300° C. for 30 to 60 minutes.

(3) Test Results

Figure 4A:
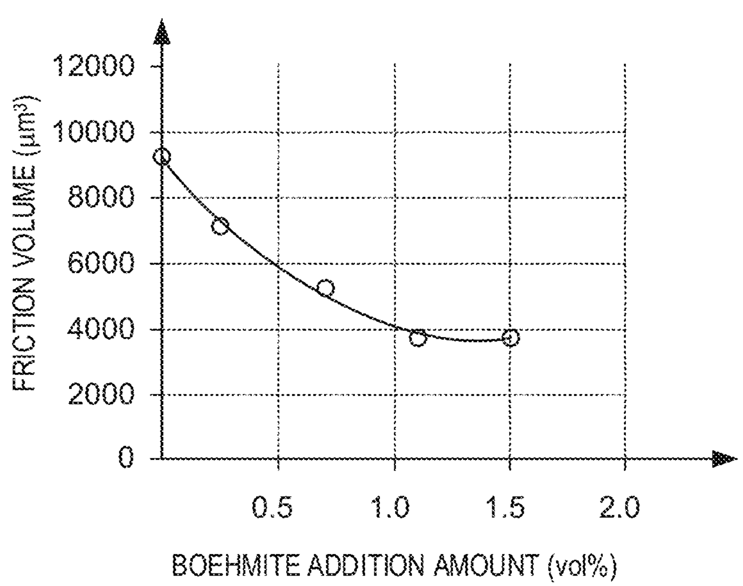
FIG. 4A is a view showing a change in a friction volume by an addition amount of boehmite.

The sliding member 1 according to the present embodiment manufactured as described above was used as an example, and an evaluation test of wear resistance and an evaluation test of seize resistance were performed. First, a test was conducted to evaluate the relationship between the concentration of boehmite particles and the wear amount of the resin coating layer. FIG. 4A is a measurement result of the wear amount for a plurality of samples manufactured by changing the addition amount of boehmite particles while setting the volume fraction of the molybdenum disulfide particles contained in the overlay 12 to 30 vol %. In FIG. 4A, the horizontal axis represents the addition amount (vol %) of boehmite particles, and the vertical axis represents the volume ($\mu m^3$) of the resin coating layer worn by the wear test. In FIG. 4A, a curve obtained from a result of conducting a test and taking the statistics on each of a plurality of samples having the same composition is indicated by a solid line. In the graph, measurement results for some samples are indicated by white circles.

Figure 4B:
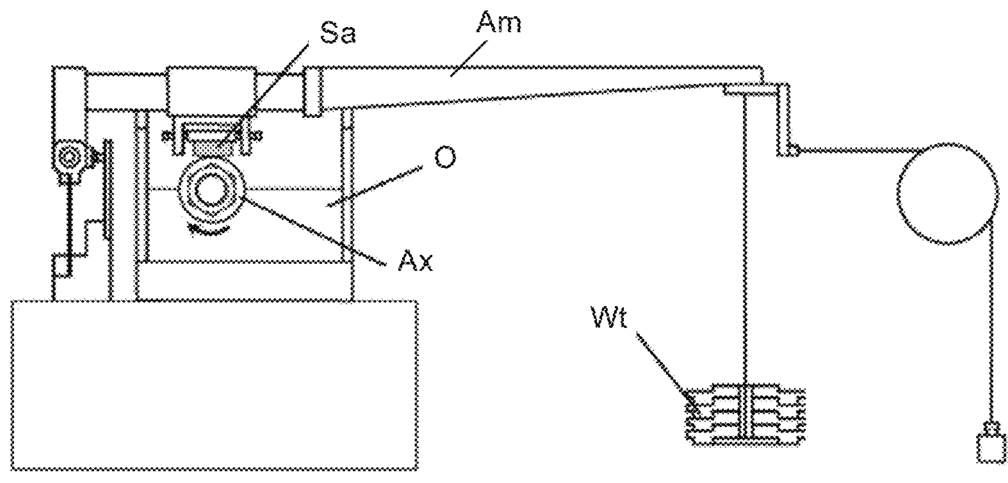
FIG. 4B is a schematic view of a testing machine for measuring a friction volume.

FIG. 4B is a diagram schematically illustrating a device for conducting the test illustrated in FIG. 4A. In the testing machine illustrated in FIG. 4B, the test shaft Ax formed by the mating material is rotatable about the axis. The test shaft Ax is immersed in oil O at normal temperature (25° C.). The oil O is, for example, a paraffinic base oil.

Figure 4C:
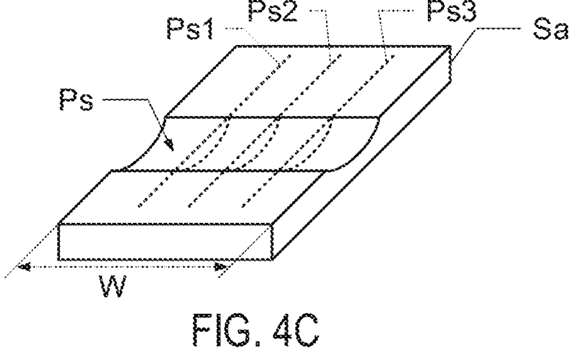
FIG. 4C is a view for explaining a method for measuring a wear amount.

The sample Sa is held in contact with the upper end of the test shaft Ax, and a force is applied from the sample Sa toward the test shaft Ax by the weight Wt attached to the arm Am. Note that in the test illustrated in FIG. 4A, the sample Sa has a flat plate shape. The test shaft Ax was rotated at a rotation speed of 60 rpm in a state where the force acting between the plurality of samples Sa having different volume fractions of boehmite particles and the test shaft Ax as a mating material was 90 N. This test was performed for 1 hour for each sample Sa, and the volume of the worn resin coating layer was measured by a measuring instrument (laser microscope). The volume of the worn resin coating layer was specified by setting cross sections at a plurality of places (three places Ps1 to Ps3 shown in FIG. 4C) in a direction perpendicular to the direction of the test shaft Ax at the time of sliding in the worn portion Ps of the worn sample Sa as illustrated in FIG. 4C, and integrating the average value of the cross-sectional areas of the respective cross sections over the width Pw.

In the test illustrated in FIG. 4A, the wear volume was measured for a plurality of volume fractions from a sample in which the volume fraction of boehmite particles is 0 vol % to a sample in which the volume fraction of boehmite particles is 1.5 vol %. When the volume fraction of the boehmite particles changes in this range, the wear volume when the volume fraction of the boehmite particles is 0 vol % is the largest, and the wear volume gradually decreases as the volume fraction of the boehmite particles increases. Furthermore, it is found that when the volume fraction of the boehmite particles exceeds 1.0 vol %, the wear volume hardly changes even if the volume fraction of the boehmite particles increases. Therefore, in the resin coating layer, when the volume fraction of the boehmite particles is greater than 0 vol % and less than or equal to 1.0 vol %, wear resistance can be improved. The volume fraction of the boehmite particles merely needs to be greater than 0 vol %, but according to FIG. 4A, when the boehmite particles are added even slightly, such as 0.1 vol % or 0.25 vol %, the wear resistance can be reliably improved as compared with the case where the boehmite particles are not added.

Figure 5A:
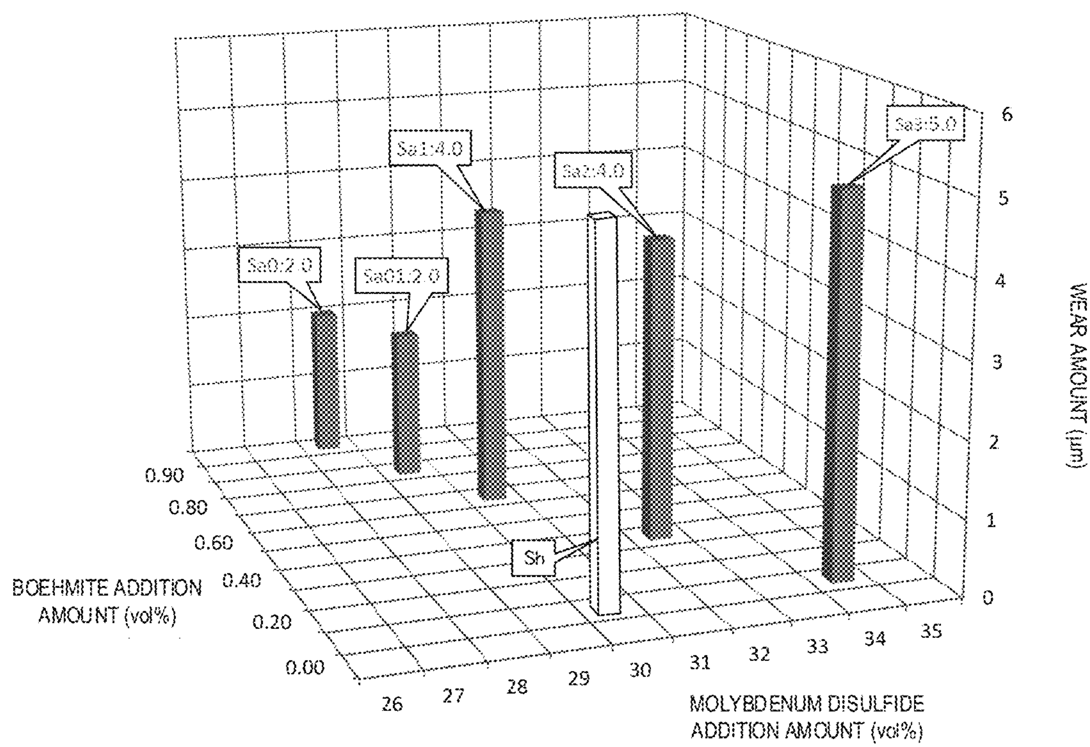
FIG. 5A is a view showing a change in a wear amount by an addition amount of boehmite and an addition amount of molybdenum disulfide.

Next, an evaluation test for a sample in which the volume fraction of molybdenum disulfide is changed will be described. FIG. 5A is a measurement result of the wear amount for each of the sample Sa1 in which the volume fractions of the molybdenum disulfide particles and the boehmite particles contained in the overlay 12 are 30 vol % and 0.7 vol %, the sample Sa2 in which the volume fractions are 32 vol % and 0.4 vol %, the sample Sa3 in which the volume fractions are 34 vol % and 0.1 vol %, the sample Sa0 in which the volume fractions are 28 vol % and 1.0 vol %, and the sample Sa01 in which the volume fractions are 29 vol % and 0.85 vol %.

The axis in the left-right direction in FIG. 5A represents the addition amount (vol %) of molybdenum disulfide, the axis in the depth direction represents the addition amount (vol %) of boehmite particles, and the axis in the up-down direction represents the wear amount (μm) of the resin coating layer worn by the wear test. In FIG. 5A, the wear amount after the wear test in each of the five types of samples described above is indicated by the height of a gray bar graph extending in the up-down direction. That is, the wear amount of the sample Sa1 is 4.0 μm, the wear amount of the sample Sa2 is 4.0 μm, the wear amount of the sample Sa3 is 5.0 μm, the wear amount of the sample Sa0 is 2.0 μm, and the wear amount of the sample Sa01 is 2.0 μm.

Figure 5B:
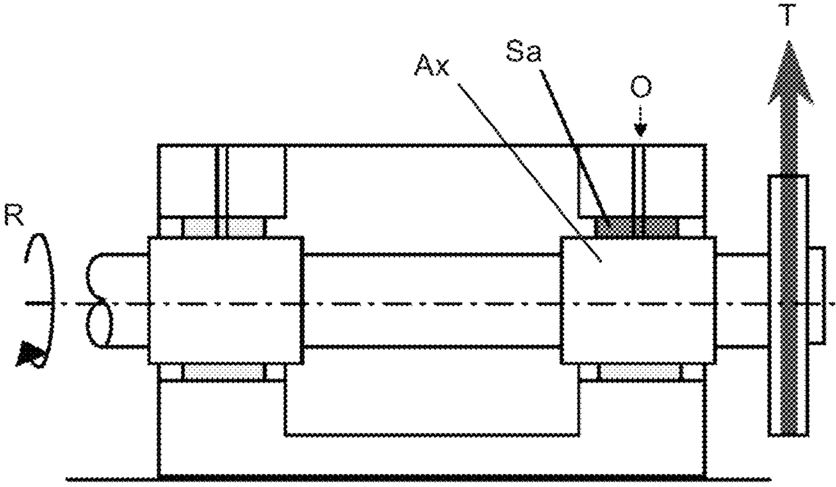
FIG. 5B is a schematic view of a testing machine for measuring the wear amount.

FIG. 5B is a diagram schematically illustrating a static load bearing testing machine for performing the evaluation test of the wear amount illustrated in FIG. 5A. In the testing machine illustrated in FIG. 5B, the test shaft Ax formed by the mating material is rotatable in the R direction about the axis. Furthermore, a disk is attached coaxially with the test shaft Ax, and the tension T can be applied in the arrow direction by the belt. The test shaft Ax is borne via the sample Sa, and engine oil (0W-20) O at 80° C. is supplied between the sample Sa and the test shaft Ax through an oil supply port.

The test was conducted by executing 21000 cycles of an operation pattern in which the tension T is set to 3000 N and rotation and stop are repeated 15 seconds each for each of a plurality of samples Sa1 to Sa3 having different volume fractions of boehmite particles. After the test, the wear amount was measured for each of the samples Sa1 to Sa3. Note that the wear amount of the resin coating layer is a difference between before and after the test of the thickness measured by a thickness measuring instrument.

Wear amounts of the samples Sa1 to Sa3, Sa0, and Sa01 are 2.0 μm to 5.0 μm. Here, a sample using the same kind of hard material as the sliding member disclosed in Patent Document 1 is used as a comparative example. Specifically, a comparative example in which SiC as a hard material contained in the overlay 12 is 0.7 vol % and graphite as a solid lubricant is 40 vol % was prepared, and the wear amount was evaluated under the same conditions as those of the samples Sa1 to Sa3, Sa0, and Sa01. As a result, the wear amount was 7 μm. Therefore, all of the samples Sa1 to Sa3, Sa0, and Sa01 according to the present embodiment have a smaller wear amount as compared with the resin coating layer using a hard material harder than the boehmite particles.

From the result of FIG. 4A, it is found that the wear amount decreases as the volume fraction of the boehmite particles increases. It is also found that when the volume fraction of the boehmite particles exceeds 1.0 vol %, the decrease width of the wear amount becomes smaller. Focusing on the sample Sa1 illustrated in FIG. 5A, the sample Sa1 has the same volume fractions of boehmite particles and molybdenum disulfide as those of the sample subjected to the test in FIG. 4A. Therefore, in the example illustrated in FIG. 5A, when the volume fraction of molybdenum disulfide is fixed at 30% and the volume fraction of boehmite particles is increased, it is considered that the property of the wear amount changes in the same manner as in FIG. 4A. For this reason, in the sample in which the volume fraction of the boehmite particles is increased more than that in the sample Sa1, it is considered that the wear amount decreases at least until the volume fraction exceeds 1.0 vol %. Therefore, when the volume fraction of molybdenum disulfide is 30 vol %, if a sliding member in which the volume fraction of boehmite particles is in the range of 0.7 vol % to 1.0 vol % is manufactured, a sliding member in which the wear amount is small as compared with the wear amount in the comparative example and the wear resistance is high can be obtained.

On the other hand, from the result of FIG. 4A, it is considered that the wear amount increases as the volume fraction of boehmite particles decreases. Therefore, when the volume fraction of boehmite particles decreases in the sample Sa1 illustrated in FIG. 5A, it is considered that the wear amount increases with decrease in the volume fraction of the boehmite particles. Here, focusing on the sample Sa3 illustrated in FIG. 5A, the wear amount of the sample Sa3 is 5.0. Therefore, a sample Sh in which the volume fraction of molybdenum disulfide is decreased to 30 vol % without changing the volume fraction of boehmite particles of the sample Sa3 is virtually considered. If the volume fraction of molybdenum disulfide is decreased without changing the volume fraction of boehmite particles, the volume fraction of polyamidimide resin increases instead. When molybdenum disulfide and polyamidimide resin are compared, the polyamidimide resin is harder and contributes to improvement of wear resistance. Therefore, it is considered that when the volume fraction of molybdenum disulfide is decreased and the volume fraction of polyamidimide resin is increased instead, the wear amount may be decreased, but the wear amount is not increased. In FIG. 5A, the upper limit of the value considered as the wear amount of the sample Sh is indicated by a white bar graph. Therefore, when the volume fraction of molybdenum disulfide is 30 vol %, if a sliding member in which the volume fraction of boehmite particles is in the range of 0.1 vol % to 0.7 vol % is manufactured, a sliding member in which the wear amount is small as compared with the wear amount in the comparative example and the wear resistance is high can be obtained.

Therefore, when the volume fraction of molybdenum disulfide is 30 vol %, if a sliding member in which the volume fraction of boehmite particles is in the range of 0.1 vol % to 1.0 vol % is manufactured, a sliding member in which the wear amount is small as compared with the wear amount in the comparative example and the wear resistance is high can be obtained. As described above, even if the volume fraction of molybdenum disulfide is decreased and the volume fraction of the polyamidimide resin is increased instead, it is considered that the wear amount does not increase. Therefore, when the volume fraction of boehmite particles is in the range of 0.1 vol % to 1.0 vol %, it is considered that a sliding member having high wear resistance can be obtained even if the volume fraction of molybdenum disulfide is less than 30 vol %. For example, even when the volume fraction of molybdenum disulfide is a value such as 28 vol % or 29 vol %, it is considered that a sliding member having high wear resistance can be obtained.

Furthermore, focusing on the sample Sa3 illustrated in FIG. 5A, a case where the volume fraction of molybdenum disulfide is fixed at 34% and the volume fraction of boehmite particles is increased is considered. In this case, it is considered that the property of the wear amount changes in the same manner as in FIG. 4A. For this reason, in the sample in which the volume fraction of the boehmite particles is increased more than that in the sample Sa3, it is considered that the wear amount decreases at least until the volume fraction exceeds 1.0 vol %. Therefore, when the volume fraction of molybdenum disulfide is 34 vol %, if a sliding member in which the volume fraction of boehmite particles is in the range of 0.1 vol % to 1.0 vol % is manufactured, a sliding member in which the wear amount is small as compared with the wear amount in the comparative example and the wear resistance is high can be obtained.

Even in the sample Sa2, the change in the wear amount is considered to be equivalent. Therefore, when the volume fraction of molybdenum disulfide is 30 vol % to 34 vol %, if a sliding member in which the volume fraction of boehmite particles is in the range of 0.1 vol % to 1.0 vol % is manufactured, a sliding member in which the wear amount is small as compared with the wear amount in the comparative example and the wear resistance is high can be obtained. Even in the samples Sa0 and Sa01, the change in the wear amount is considered to be equivalent. For example, a case is considered in which the volume fraction of boehmite particles is decreased to 0.1 vol % without changing the volume fraction of molybdenum disulfide based on the sample Sa0 in which the volume fraction of molybdenum disulfide is 28 vol % and the volume fraction of boehmite particles is 1.0 vol %. In this case, it is considered that the wear amount of the sample increases as the volume fraction of the boehmite particles decreases, but even if the volume fraction is decreased to 0.1 vol %, the wear amount is considered to be smaller than 5.0 μm. As described above, focusing on the sample Sa3, if the volume fraction of molybdenum disulfide is decreased without changing the volume fraction of the boehmite particles, the volume fraction of the polyamidimide resin increases instead, so that the wear amount may decrease, but it is considered that the wear amount does not increase. For this reason, as in the samples Sa0 and Sa01, when a sliding member in which the volume fraction of boehmite particles is in the range of 0.1 vol % to 1.0 vol % is manufactured regardless of whether the volume fraction of molybdenum disulfide is 28 vol % or 29 vol %, a sliding member in which the wear amount is small as compared with the wear amount in the comparative example and the wear resistance is high can be obtained.

Figure 6A:
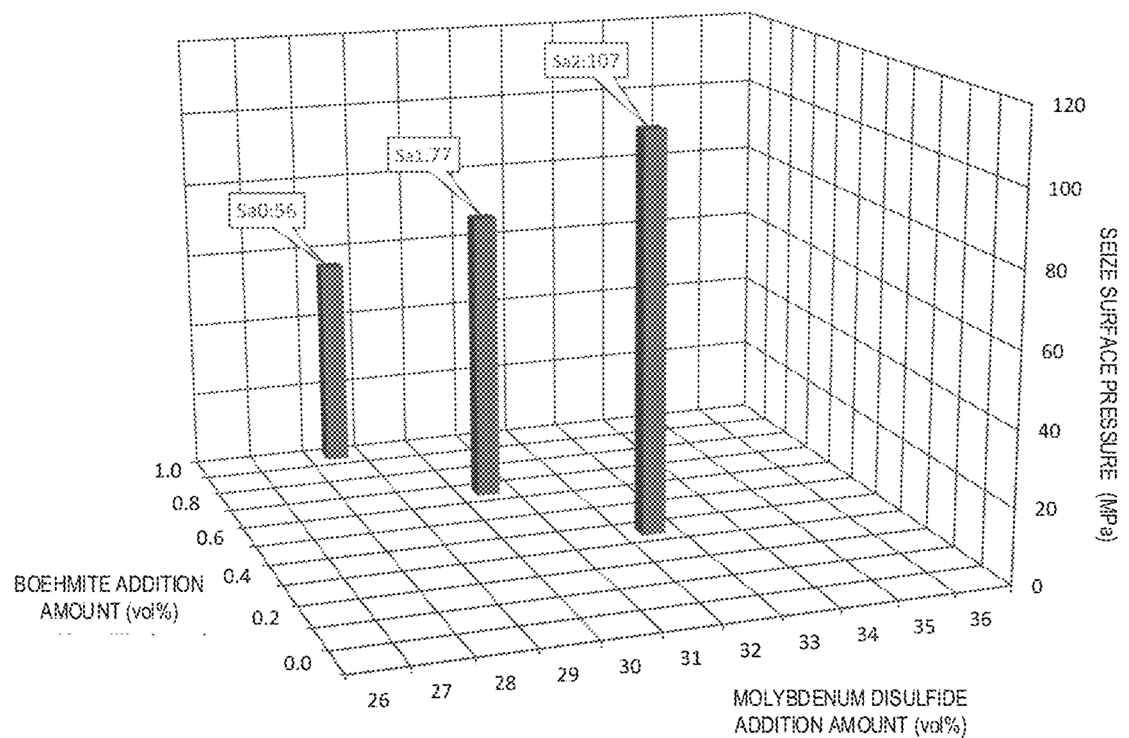
FIG. 6A is a view showing a change in a seize surface pressure by an addition amount of boehmite and an addition amount of molybdenum disulfide.

FIG. 6A is a measurement result of the seize surface pressure for each of the sample Sa0 in which the volume fractions of the molybdenum disulfide particles and the boehmite particles contained in the overlay 12 are 28 vol % and 1.0 vol %, the sample Sa1 in which the volume fractions are 30 vol % and 0.7 vol %, and the sample Sa2 in which the volume fractions are 32 vol % and 0.4 vol %.

In FIG. 6A, the axis in the left-right direction is the addition amount (vol %) of molybdenum disulfide, the axis in the depth direction is the addition amount (vol %) of boehmite particles, and the axis in the up-down direction is the seize surface pressure (MPa) measured by the test. In FIG. 6A, the seize surface pressure after the wear test in each of the three types of samples described above is indicated by the height of the bar graph extending in the up-down direction. That is, the seize surface pressure of the sample Sa0 is 56 MPa, the seize surface pressure of the sample Sa1 is 77 MPa, and the seize surface pressure of the sample Sa2 is 107 MPa.

Figure 6B:
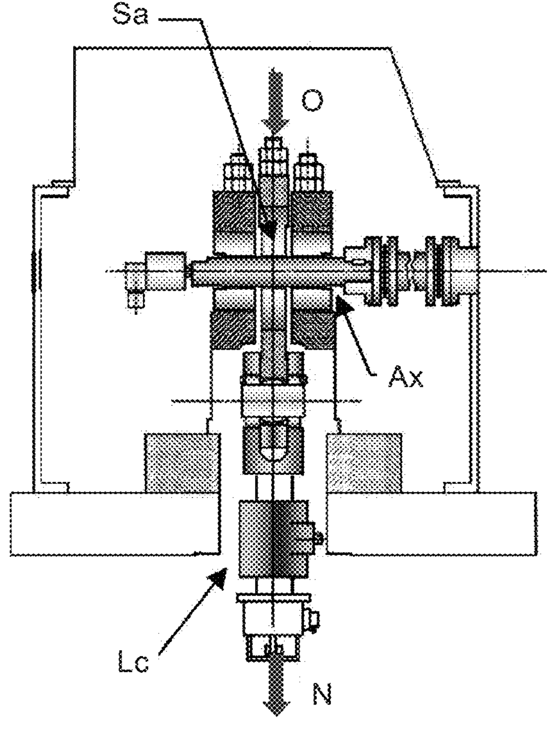
FIG. 6B is a schematic view of a testing machine for measuring the seize surface pressure.

FIG. 6B is a diagram schematically illustrating a static load bearing testing machine for performing the evaluation test of the seize surface pressure illustrated in FIG. 6A. In the testing machine illustrated in FIG. 6B, the test shaft Ax formed by the mating material is rotatable about the axis. The test shaft Ax is borne via the sample Sa, and engine oil (0W-20) O at 140° C. is supplied between the sample Sa and the test shaft Ax through an oil supply port. A member that acts the load N is coupled to the sample Sa, and the load cell Lc is coupled to the member.

When the load N is acted to each of the plurality of samples Sa0 to Sa2 having different volume fractions of boehmite particles, the load is increased by 3 kN steps of 0 KN, 3 kN, 6 kN . . . . In addition, each load is increased by 3 kN after being maintained for 3 minutes, and the test shaft Ax is rotated for 3 minutes in a state where the load is constant. The rotation speed is 6400 rpm. In this example, the seizure load is measured by the above testing machine. Here, the seizure load is a load when a predetermined temperature (a temperature at which seizure is assumed to have occurred) is reached. The temperature can be measured by a temperature sensor or the like attached to a bearing or the like of the test shaft Ax.

The seize surface pressure of the samples Sa0 to Sa2 is 56 to 107 MPa. Here, a sample using the same kind of hard material as the sliding member disclosed in Patent Document 1 is used as a comparative example. Specifically, a comparative example in which SiC as a hard material contained in the overlay 12 is 0.7 vol % and graphite as a solid lubricant is 40 vol % was prepared, and the seize surface pressure was evaluated under the same conditions as those of the samples Sa0 to Sa2. As a result, the seize surface pressure was 55 MPa. Therefore, all of the samples Sa0 to Sa2 according to the present embodiment have a larger seize surface pressure as compared with the resin coating layer using a hard material harder than the boehmite particles.

In the present embodiment, it is considered that the hardness of the overlay 12 mainly changes according to the volume fraction of boehmite particles and the volume fraction of the polyamidimide resin. That is, as the volume fraction of the boehmite particles becomes larger, the wear amount of the resin coating layer becomes smaller due to the hard material. When molybdenum disulfide and polyamidimide resin are compared, the polyamidimide resin is harder. Therefore, when the volume fraction of the boehmite particles is the same, the larger the volume fraction of the polyamidimide resin (the smaller the volume fraction of molybdenum disulfide), the smaller the wear amount of the resin coating layer.

When the resin coating layer is hard, as a result of sliding, the resin coating layer cannot follow the mating material, conformability to the mating material lowers, and heat is easily generated. Therefore, in the overlay 12 according to the present embodiment, the larger the volume fraction of the boehmite particles, the smaller the seize surface pressure, and the larger the volume fraction of the polyamidimide resin, the smaller the seize surface pressure.

Focusing on the sample Sa0 shown in FIG. 6A, the seize surface pressure increases both when the volume fraction of boehmite particles is decreased as compared to the sample Sa0 and when the volume fraction of molybdenum disulfide is increased (when the volume fraction of the polyamidimide resin is decreased). Since the seize surface pressures of the samples Sa1 and Sa2 are both larger than the seize surface pressure of the sample Sa0, changes in the seize surface pressure due to the volume fraction of boehmite particles and the volume fraction of molybdenum disulfide are supported by the values of the seize surface pressures of the samples Sa1 and Sa2.

Therefore, a sliding member in which the seize surface pressure is large as compared with the seize surface pressure in the comparative example and the wear resistance is high can be obtained by at least manufacturing a sliding member in which the volume fraction of boehmite particles is less than 1.0 vol % and the volume fraction of molybdenum disulfide is greater than 28 vol %.

(4) Other Embodiments

In the above-described embodiment, the sliding member 1 constituting the slide bearing A that bears the crankshaft of the engine has been exemplified, but the slide bearing A for other purposes may be formed by the sliding member 1 of the present invention. For example, a radial bearing such as a gear bush or a piston pin bush/boss bush for a transmission may be formed by the sliding member 1 of the present invention.

The base layer may be a layer whose surface is coated with the resin coating layer and which constitutes a part of the sliding member. Therefore, the composition, shape, and the like are not limited. In addition, the mating material is not limited to the circular column shaft as in the embodiment described above, and may be a flat surface or a spherical surface. The resin coating layer may be formed on the base layer. That is, the base layer may be coated so that contact between the base layer and the mating material does not occur. Furthermore, in the embodiment described above, the thickness of the resin coating layer is 6 μm, but the thickness is not limited. That is, various thicknesses may be set according to the purposes of the sliding member, the material of the mating material, the relative speed between the sliding member and the mating material, and the like.

The sliding member may be a member used in a state in which at least one of the sliding member and the mating material performs a movement such as rotation or reciprocation in a state where the liquid lubricant is interposed between the resin coating layer and the mating material. Therefore, the sliding member is not limited to the radial bearing as in the above-described embodiment, and may be a thrust bearing, various washers, a swash plate for a car air conditioner compressor, or the like.

The solid lubricant may be any material as long as it is in a solid state under the usage environment of the sliding member, and the friction coefficient between the sliding member and the mating material is smaller due to the presence of the solid lubricant than when the solid lubricant is not present. Therefore, the solid lubricant is not limited to the molybdenum disulfide described above, and may be various solid lubricants such as graphite, boron nitride, tungsten disulfide, PTFE (polytetrafluoroethylene), graphite fluoride, and MCA (melamine cyanurate). One kind of these solid lubricants may be used, or two or more kinds thereof may be used.

The additive may or may not be contained in the resin coating layer. The additive may be used for various purposes, for example, when barium sulfate is used as an additive, the additive transfers to the mating material to coat the mating material, whereby occurrence of seizure can be suppressed.

Furthermore, various intermediate layers may be formed between the base layer and the resin coating layer. For example, a layer for improving adhesiveness between the base layer and the resin coating layer or a layer for preventing mutual diffusion of material between the base layer and the resin coating layer may be formed.

What is claimed is:

1. A sliding member comprising a base layer and a resin coating layer formed on the base layer; wherein
- the resin coating layer includes,
- a polyamidimide resin as a binder;
- a solid lubricant;
- boehmite particles of greater than 0 vol % and less than or equal to 1.0 vol %; and
- inevitable impurities; wherein
- the solid lubricant is molybdenum disulfide, and the molybdenum disulfide is 28 vol % to 40 vol % of the resin coating layer, and
- the resin coating layer is a surface layer having a surface that constitutes a sliding surface with a mating material.

2. A slide bearing comprising a base layer and a resin coating layer formed on the base layer; wherein
- the resin coating layer includes,
- a polyamidimide resin as a binder;
- a solid lubricant;
- boehmite particles of greater than 0 vol % and less than or equal to 1.0 vol %; and
- inevitable impurities; wherein
- the solid lubricant is molybdenum disulfide, and the molybdenum disulfide is 28 vol % to 40 vol % of the resin coating layer, and
- the resin coating layer is a surface layer having a surface that constitutes a sliding surface with a mating material.

* * * * *